UNITED STATES PATENT OFFICE.

LEOPOLD SCHEPP, OF NEW YORK, N. Y.

COCOANUT COMPOUND.

SPECIFICATION forming part of Letters Patent No. 398,083, dated February 19, 1889.

Application filed December 15, 1888. Serial No. 293,720. (No specimens.)

*To all whom it may concern:*

Be it known that I, LEOPOLD SCHEPP, of the city, county, and State of New York, have invented a new and useful Improvement in Food Compounds, of which the following is a full, clear, and exact description.

The object of my invention is to produce a special dry food compound the ingredients of which shall be so prepared and proportioned as that the article will be ready—that is, upon short notice and with but little trouble and expense—for immediate use by the purchaser or consumer and with much greater convenience and less waste, and the whole be much more correctly prepared than if the ingredients were separately purchased and afterward mixed by the consumer.

Supposing the amount of the compound to be made at one time to be one hundred pounds, (but it is proposed to make it in larger quantities,) I then mix with about thirty pounds of granulated, dried, or desiccated cocoanut reduced to the fineness of granulated sugar about thirty-five pounds of pulverized sugar, thirty pounds, or thereabout, of corn-starch baked in a kiln to cure and lighten it and to more effectually preserve it, about three pounds of dried and pulverized gelatine, one pound, or thereabout, of a flavoring extract—such, for instance, as rose or vanilla—and about half of a pound of cream of tartar and a like quantity of salt. All these ingredients are put into a dasher mixing-machine and thoroughly mixed for, say, twenty minutes or until the preparation is perfectly blended together, after which it is passed to cooling-tables to cool, and subsequently put up in small-sized air and water tight packages for family use and into larger-sized packages for hotel use and other purposes.

This compound is ready to absorb milk and beaten eggs without any additional mixing. It may be utilized by first boiling milk in a suitable vessel, then beating one or more eggs in cold milk and adding thereto a suitable proportion of the compound, then mixing the whole when the heated milk is at boiling-point and stirring the mass until it thickens, when the whole may be poured into a mold to cool and be afterward served, with sauce to suit taste, as a cocoanut-cream pudding, which is more especially the use the compound is designed for. My improved food compound may, however, be otherwise used, if desired.

I claim—

The herein-described food compound in dry and granulated form, consisting of cocoanut, sugar, kiln-dried starch, gelatine, a flavoring extract, cream of tartar, and salt, the ingredients being in the proportion substantially as set forth.

LEOPOLD SCHEPP.

Witnesses:
- C. H. SCHULTHEIS,
- R. G. CROW.